M. B. SOUTHWICK.

Mode of Desiccating Articles of Food.

No. 1,753. Reissued Aug. 30, 1864.

Witnesses:

E. R. McKeay

W. E. Dodge

Inventor:

Moses B. Southwick

By his Atty's.

Smith & Dodge.

UNITED STATES PATENT OFFICE.

MASA BRANCH SOUTHWICK, OF ST. HILAIRE, CANADA.

IMPROVED MODE OF DESICCATING ARTICLES OF FOOD.

Specification forming part of Letters Patent No. 14,297, dated September 15, 1853; Reissue No. 1,753, dated August 30, 1864.

*To all whom it may concern:*

Be it known that I, MASA B. SOUTHWICK, of the parish of St. Hilaire, Canada, have invented a new and useful Mode of Drying Potatoes, Roots, Vegetables, Fruit, and other Substances; and I do hereby declare that the following is a full and exact description thereof, reference being had to the accompanying drawings, and to the letters of reference marked thereon.

My invention consists, first, in a novel method or process of desiccating food for preservation; and, second, in the apparatus by which the process is applied.

Heretofore various methods have been adopted for the purpose of drying and otherwise preserving food for transportation, use on shipboard, &c., such as drying it in furnaces, in heated rooms, and by applying currents of cold air, &c.; but these processes are all slow and tedious, and therefore not adapted to the rapid preparation of food in lare quantities, such as my invention contemplates.

My process consists in applying an artificial current of hot air direct to the substance to be desiccated, any suitable mechanism being used for the purpose. By this means I am enabled to greatly facilitate the process by which a given quantity of material can be prepared in much less time than by the processes heretofore in use, and a much larger quantity in a given time.

It is obvious that various kinds of mechanical devices may be used to apply my process, the principal requisites being a strong current of hot air, in connection with devices for bringing the substance to be operated upon under the influence of the blast, and devices for stirring, crushing, and granulating the same.

Figure 1:
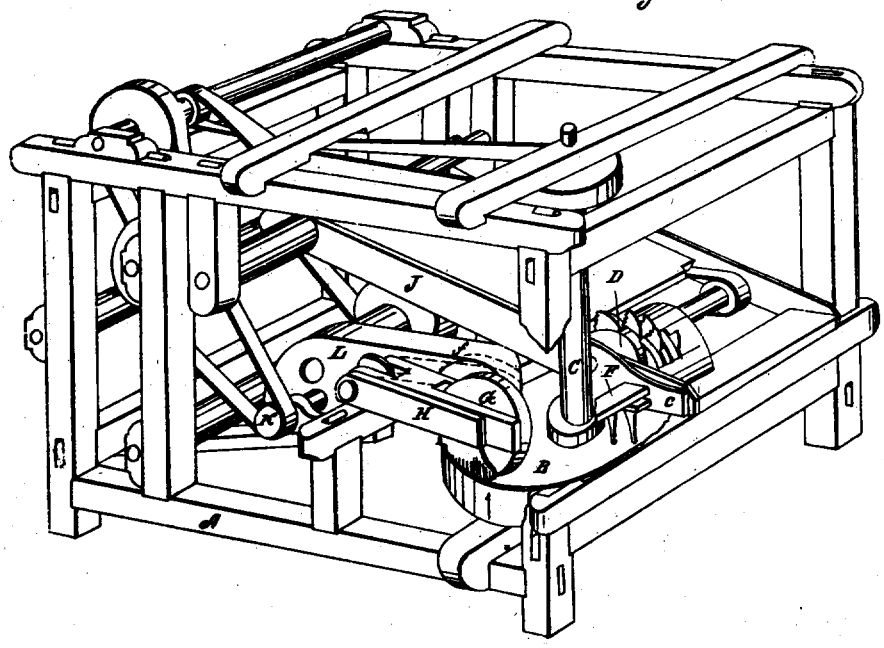
Figure 2:
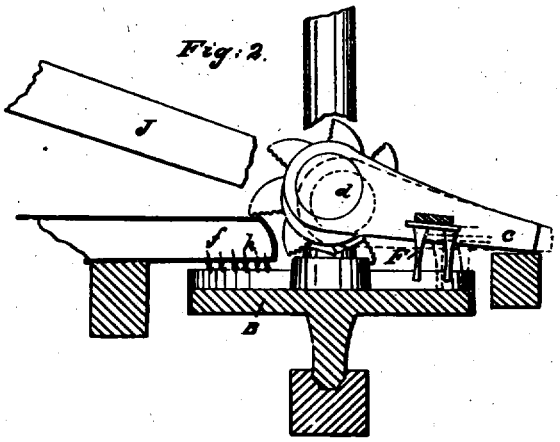
Figure 3:
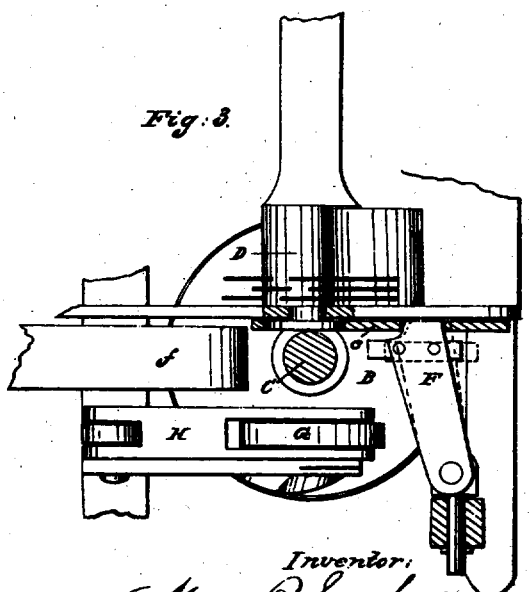

In the accompanying drawings, Figure 1 is a perspective view of a machine invented by me for applying my process of desiccation. Fig. 2 is a vertical section, and Fig. 3 a top plan view of a portion of the same.

A represents the frame, which may be of any suitable form and size to support the working mechanism.

B is a circular table, having a rim or curb, *a*, secured to it. This table B is mounted upon the shaft C, which is secured in proper bearings to admit of its being freely rotated.

D is a cylinder, armed with radial knives of the form shown in the several figures, and which have their front edges serrated, as shown. This cylinder D is mounted in a swinging frame, J, and is so located that the knives in revolving shall pass through the substances placed upon the table B.

G is a roller for crushing or pulverizing the food, and is mounted in the swinging frame H, so that it can be raised up from contact with the table B or its contents.

F is a rake, pivoted at *b* and connected at its opposite end to the piece *c*, as shown in the various figures. This piece *c* is mounted upon an eccentric, *d*, on the end of cylinder D, as shown in Fig. 2, by which a lateral to-and-fro motion is imparted to the piece *c*, and thereby to the rake also. Upon the shaft K is mounted a fan-wheel of any suitable description, revolving within a curb, L, which has a spout, *f*, projecting over the table B, where it is provided with outlets or perforations, as shown at *h*, through which the hot air is forced by the fan direct upon the substance on table B, the hot air being conveyed to the fan in any suitable or usual manner.

These devices constitute the essential features of my apparatus, though it is obvious that they may be varied in a great variety of ways.

Its operation is as follows: The food to be desiccated—as, for instance, potatoes—is first boiled, then placed upon the revolving table B, and the table and cylinder D set in motion. As the table revolves, the potatoes are brought in contact with the blades or knives upon cylinder D, by which they are crushed, and the skins or peel is taken up on the serrated edges of the blades and thrown out. The hot blast is then applied and the rake is brought into operation, by which the pulp or food is constantly being stirred and dried, the hot air being forced upon and among the particles as the table revolves, thereby absorbing and removing the moisture contained therein.

The wheel G may be used for two purposes, first, to assist in crushing the mass when first placed on the table, especially when vegetable substances are to be operated upon; and, second, and more especially, for the purpose of granulating or pulverizing the material as it becomes thoroughly dried.

It is obvious that the potatoes may be deprived of their skins before being placed upon the table B, and by other means than those here shown, if desired.

This process of preparing foo l for preservation can be applied to all varieties of vegetable or animal substances used for food, and when thus prepared it can be preserved for a great length of time by simply storing it in such a manner as to keep it dry.

Another advantage of food thus prepared is that it is greatly concentrated or reduced in bulk, by which means a much larger quantity of nutriment can be stored in a given space, and its transportation to distant regions and in larger quantities greatly facilitated. By these means sailors upon the ocean, travelers in distant and uninhabitated regions, and armies on the march and in the field may at all times be supplied with fresh vegetable and animal food.

Having thus fully described my invention and shown one method of applying it and the mechanism necessary to its application, what I claim, and desire to secure by Letters Patent, is—

1. The process of desiccating food, composed of either vegetable or animal substances, by means of the direct application of an artificial current of hot air.

2. The revolving table B, or its equivalent, in combination with any mechanical device for creating and applying a current of air, substantially as specified.

3. The cylinder D, constructed and operating as and for the purpose set forth, whether used in combination with the revolving table B or not.

4. The rake F, in combination with the revolving table or its equivalent.

5. The roller G, in combination with the table B, or its equivalent, when constructed and operating substantially as set forth.

MASA B. SOUTHWICK.

Witnesses:

S. R. ANDRES,

E. S. EMERSON.